April 30, 1957 W. G. DIETRICH 2,790,726
SILK SCREEN PAINT MATERIALS
Filed Feb. 12, 1953 2 Sheets-Sheet 2

INVENTOR.
WILSON G. DIETRICH
BY
ATTORNEYS

United States Patent Office 2,790,726
Patented Apr. 30, 1957

2,790,726

SILK SCREEN PAINT MATERIALS

Wilson G. Dietrich, Faribault, Minn., assignor to Wilson Arts & Crafts, Faribault, Minn., a corporation of Minnesota Application February 12, 1953, Serial No. 336,535

4 Claims. (Cl. 106—286)

The present invention relates to new and useful improvements in silk screen paint materials.

In the prior art, there has remained the problem that most art paint materials are too expensive or too difficult for the amateur, and particuarly for small children to use. The prior art paint materials are either not susceptible to the technique of screen painting or if they are so susceptible they are not likewise susceptible to the techniques of finger and brush painting. Furthermore, painting by the conventional silk screen process requires a particularly fine screen of silk organdy fabric which is far too expensive to be used by the ordinary amateur painter, and the paints heretofore used have required the blocking out of portions of the silk screen by a lacquer base material or a wax, all of which makes it too complicated for the amateur and particularly for school children to use.

In addition, any one of the paints of the prior art has not been susceptible to use on an ordinary absorbent surface. Particular difficulty is encountered in use of such paints as finger paints since they must be applied to a glazed paper surface inasmuch as they will bleed through the surface of an absorbent material and give extremely poor results. There has not been a paint material which will perform the three functions of a screen paint, a finger paint and a brush paint.

In addition, there has also not been a paint material suitable for use in screen painting which will work with either an absorbent stencil or an absorbent screen mesh. Prior paints have been non-coagulative and either have a tendency to bleed through the stencil or penetrate the screen mesh.

It is therefore an object of this invention to provide a new and useful "non-bleeding" paint composition; having coagulative properties;

It is also an object of this invention to provide a new and useful paint composition in powder form for convenience in storing and shipping;

It is a further object of this invention to provide new and useful improvements in an inexpensive quality art paint;

A still further object of this invention is to provide a new and useful versatile paint medium of unique composition;

It is a further object of this invention to provide a slow drying art paint material containing no starch, soap or grease, which will not spoil with age or extreme temperatures in either moist or dry form and in which the colors will mix readily with one another and wash readily;

It is still a further object of this invention to provide a new and useful art paint material free from the toxic effects of lead or cadmium;

It is still a further object of this invention to provide a new and useful paint in the dry form which may be readily mixed with water for use as an art medium or other purpose;

It is still a further object of this invention to provide a new and useful art paint material susceptible to various painting techniques, such as finger, brush or screen painting;

A further object of this invention resides in the method of providing painted articles in which stencils of various types may be used;

Other and further objects of this invention reside in the method of painting an article wherein a mesh screen is positioned on top of a stencil cut from various films which is cemented thereto by use of the medium being applied through the stencil;

Other and further objects of this invention are those apparent and inherent in the apparatus as pictured, described and claimed.

The method of providing a painted article will be described with reference to the drawings in which corresponding numerals refer to the same parts and in which.

In accordance with my invention, a screen surface is provided to which a stencil or template of various films is cemented by the original coat of my paint medium. In the preferred embodiment of my invention an absorbent film is used but other films are within its spirit and scope. This original or initial coat of my paint serves to cement the stencil securely to the screen and thereafter stenciled impressions can be made by applying subsequent coats through the cut-out portions. Thus, when the paint material is flowed across the cut-out portions by any suitable means, it penetrates therethrough and leaves an impression upon any suitable surface.

Figure 2:
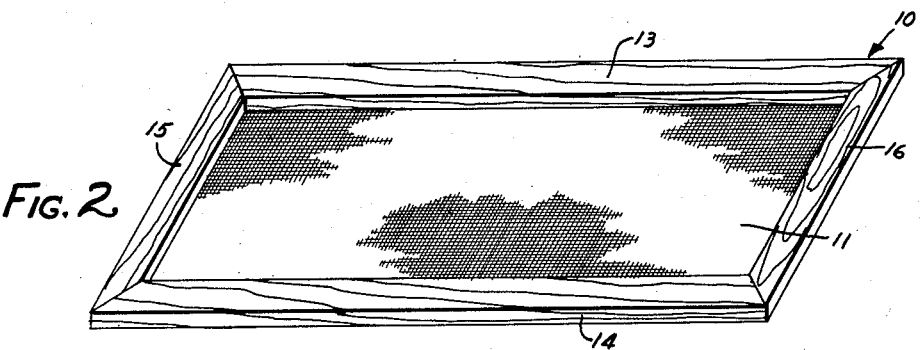
Figure 2 is an isometric view of the screen upon which said stencil is to be seated.
Figure 6:
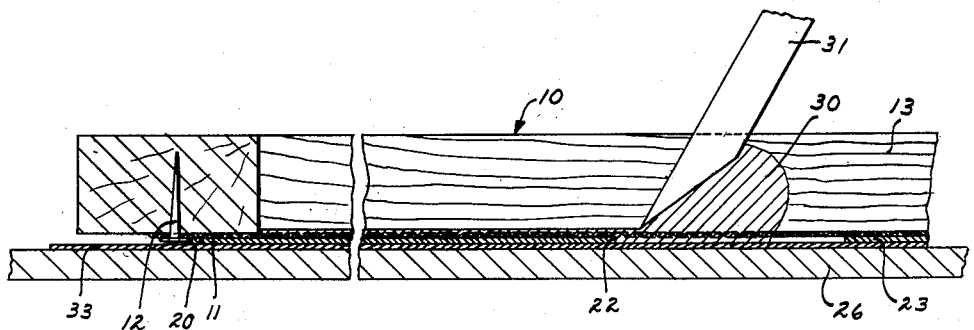
Figure 6 is a fragmentary vertical sectional view showing the paint being applied to the mesh as shown in Figure 4.

With reference to Figure 2, there is shown a suitable frame 10 having a screening 11 thereon. Frame 10 may be a frame of any sort, even an old picture frame will do. The mesh or screen 11 attached thereto may be any open material such as marquisette, curtain scrim, rayon mesh, mosquito net, nylon hose, etc., either absorbent or non-absorbent. I have found that the mesh size of the screen may vary and mesh as large as ⅛–¼ inch may be used satisfactorily. The screen 11 is attached to the frame 10 by a plurality of tacks 12 one of which is shown in Figure 6. However, it may be attached by any suitable means.

The screen frame 10 as shown in Figure 2, comprises two longitudinal members 13 and 14 and two transverse members 15 and 16. Members 15 and 16 are parallel, as are members 13 and 14. Each of the members 13–16 is provided with two beveled corners which cooperate to form a rectangular frame. However, as stated previously, the configuration of this frame may be varied without departing from the spirit and scope of this invention.

The screen 11 must be stretched on the frame in such a way that it is tight and has no folds or wrinkles therein.

Figure 1:
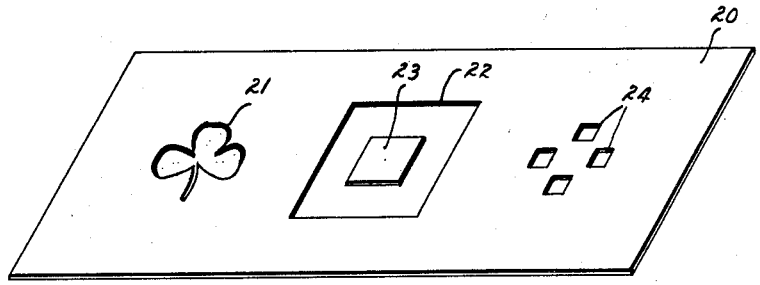
Figure 1 is an isometric view of a cut-out stencil.

The design desired to be imprinted is drawn on the stencil film which is being used. In the illustrations and the specification, it will be described as being drawn on any absorbent paper 20. Thus, as shown best in Figure 1, the design of a three-leafed clover 21, a rectangle 22 having a central insert 23 and four spaced squares 24 is provided on the sheet of absorbent paper 20 which serves as a stencil. Newsprint, writing paper, construction paper, etc., or any other suitable absorbent or non-absorbent film may be used for this stencil. However, I prefer to use an absorbent film such as newsprint or writing paper. The designs 21, 22, 23 and 24 are cut from the stencil 20 using a razor blade, scissors, sharp knife or other tool.

Figure 3:
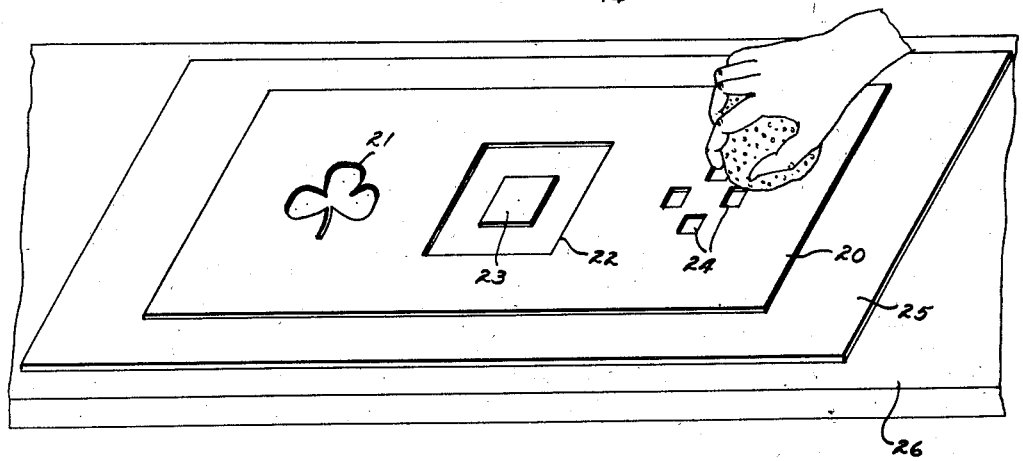
Figure 3 is an isometric view of the cut-out stencil of Figure 1, showing how the stencil is moistened before application of the screen of Figure 2.

The stencil is then placed on a sheet of paper 25 which is in turn placed on a table top 26, or the stencil 20 may be directly positioned on the table top 26 or other suitable surface and if an absorbent film is used, is dampened with water by means of a sponge or a soft cloth as is shown best in Figure 3 where the sheet 20 is illustrated as being dampened by a sponge. The dampening allows the paper to expand uniformly before it is put on the screen 11 and to prevent wrinkling.

The cut-out parts, such as the insert 23, are put in place. These may or may not be dampened. Thus, the insert 23 is placed within rectangle 22. These inserts, such as 23, need not be cemented to the screen unless they are very small. In this event, a rubber or plastic cement is spread over the upper surface thereof so that they will adhere to the screen 10 when it is placed thereover.

Figure 4:
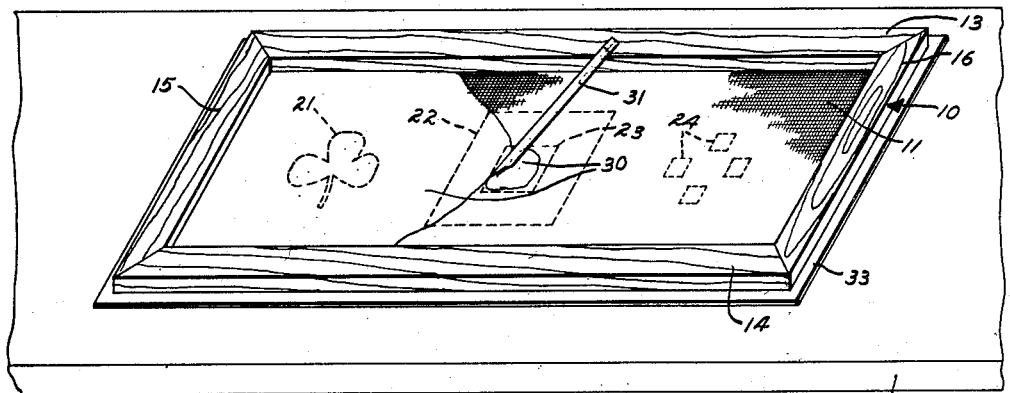
Figure 4 is an isometric view of the screen and stencil and showing the paint being applied thereto.

After the stencil has been dampened, as shown in Figure 3, the frame 10 bearing the screen 11 is positioned thereon as indicated in Figures 4 and 6.

The screen is then held in place over the dampened stencil 20 by pressure and a coagulative paint composition is squeegeed thereover as is shown in Figures 4 and 6. The spreading of the material 30 may be accomplished by a squeegee 31, the hand or other object. I prefer to use a short length of soft wood about 4 inches long and ¼ inch thick with a smooth, slightly beveled edge.

After the original coat of my material 30 has been spread over the screen 11, the paper 20 will adhere firmly to the mesh 11. It is not necessary to scrape off the excess material or to allow it to dry before reproductions can be made.

Figure 5:
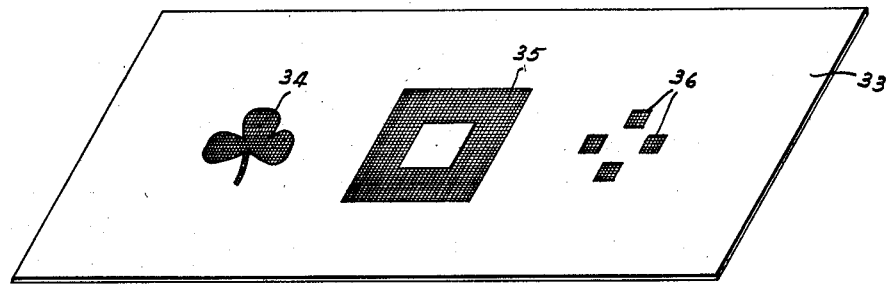
Figure 5 is an isometric view of a surface upon which figures have been stenciled as in Figure 4.

Subsequent coats of my material are rubbed across the cut-out portions of the stencil and the impressions 34, 35 and 36 are provided on any suitable surface 33 as is shown in Figure 5. I prefer to use enough of my material on the screen, placed throughout the extension of the transverse edge 15 thereof so that it is not necessary to add more material with each print. I prefer to slant the squeegee 31 at any angle of about 25° to rub the material off of the squeegee and onto the screen and then to pass the squeegee over the screen at approximately an 80° angle to scrape the excess material off the stencil area. I prefer to scrape firmly to avoid clogging of the screen and to prevent the stencil from becoming too wet.

I have found that more than 500 copies may be made without changing the stencil and that with a good strong screen an indefinite number of prints can be made. I have likewise found that colors may be changed without the necessity of washing the screen or removing the stencil. To accomplish this, it is only necessary to scrape off the excess of my paint material of one color and to add another color as heretofore described.

My composition comprises a mixture of bentonite and pigment together with a mold preventative. I have found that bentonite of the particle size of 200 mesh or finer is preferred, and when tumbled dry, mixes in the proportions of from 1 part pigment to 20 parts bentonite to 20 parts pigment to 1 part bentonite by volume to provide a paint composition having new and useful coagulative and "non-bleeding" results. In my preferred embodiment, however, 1 part pigment to 2–4 parts of bentonite is utilized. For mold prevention, I add from .02 to .1 part of borax. It is preferable that the paint material, pigment, bentonite and borax particles be a size of 200 mesh or finer, that is all of said materials passing 200 mesh. I have found it extremely simple to make various colors according to this formula, as for example, red, white, yellow, magenta, blue, green, orange, brown, rust, sungold, black, gold and silver, etc. As specific examples of my preferred formulae, I list the following:

| Parts pigment | Parts bentonite | Parts Borax |
|---|---|---|
| 1 | 4 | .02 |
| 1.5 | 4 | .02 |
| 1.75 | 4 | .08 |
| 1.75 | 4 | .04 |
| 2 | 4 | .03 |
| 2.5 | 4 | .03 |
| 2.5 | 4 | .15 |
| 2 | 4 | .1 |

My paint material is sold in the dry form and the customer mixes it according to the desired consistency, which is usually that of a soft paste or viscous liquid. While I prefer proportions of 1 part by volume of my paint to 3–4 parts of water by volume, other proportions may be used.

I have found that my paint material is a coagulative type paint having non-bleeding characteristics. Thus, when this material is used in screen painting, I have found that it allows larger mesh screens to be used and different types of fabric, even absorbent fabric screens. I have found that it will not bleed through an absorbent stencil or flow under the stencil to give undesired effects. I have found that my paint material has a pigment suspension in particles in the water, which is the suspension medium and that the particles do not dissolve in the liquid. The coagulative qualities of the paint cause it to fill up the pores of any absorbent paper stencil being used and consequently it will not bleed therethrough.

As many widely differing embodiments of this invention may be made without departing from the spirit and scope thereof, it is to be understood that I do not specifically limit myself to the embodiment disclosed herein.

What I claim is:

1. A dry finger paint and screen stencil paint material consisting essentially of from 1 part pigment to 4 parts bentonite to 2 parts pigment to 4 parts bentonite together with from .02 to .1 part of borax by volume, all particles passing 200 mesh.

2. A dry finger paint and screen stencil paint material consisting essentially of from 1 part pigment to 20 parts bentonite to 20 parts pigment to 1 part bentonite together with from .02 to .1 part of borax by volume, all the particles passing 200 mesh.

3. A coagulative and non-bleeding screen stencil paint material consisting essentially of from 1 part pigment to 20 parts bentonite by volume to 20 parts pigment to 1 part bentonite by volume, all of said materials passing 200 mesh, and from .02 part by volume to .1 part by volume of borax, all of said materials mixed in water, the ratio of the volume of water to dry materials being the ratio of from 3 to 1 to 4 to 1.

4. A coagulative and non-bleeding screen stencil paint material consisting essentially of from 1 part pigment to 4 parts bentonite to 2 parts pigment to 4 parts bentonite together with from .02 to .1 part of borax by volume, said particles passing 200 mesh, and water mixed with said powdered materials in a ratio of from 3 to 4 parts of water to 1 part of powdered materials by volume.

References Cited in the file of this patent

UNITED STATES PATENTS

| | | |
|---|---|---|
| 891,724 | Den Ouden | June 23, 1908 |
| 1,364,353 | Coleman | Jan. 4, 1921 |
| 1,415,380 | Mikesell | May 9, 1922 |
| 1,478,745 | Kem | Dec. 25, 1923 |
| 1,636,546 | Bates et al. | July 19, 1927 |
| 2,343,158 | Scott | Feb. 29, 1944 |